United States Patent [19]

Smith

[11] Patent Number: 4,728,088
[45] Date of Patent: Mar. 1, 1988

[54] HELICALLY WOUND BUSHING

[75] Inventor: Joseph E. Smith, Birmingham, Mich.

[73] Assignee: V. W. Kaiser Engineering, Inc., Millington, Mich.

[21] Appl. No.: 862,288

[22] Filed: May 12, 1986

Related U.S. Application Data

[63] Continuation of Ser. No. 664,362, Oct. 23, 1984, abandoned.

[51] Int. Cl.$^4$ .................. B60G 11/14; F16F 1/06; F16C 13/02; B24B 1/04
[52] U.S. Cl. .................................. 267/286; 51/290; 251/902; 267/167; 384/388
[58] Field of Search .............. 267/54 R, 61 R, 73, 267/74, 166, 167, 60, 180, 286, 249; 384/301, 292, 322, 373, 378, 388, 392; 280/96.1, 93; 29/173; 51/245, 290; 251/902

[56] References Cited

U.S. PATENT DOCUMENTS

| | | | |
|---|---|---|---|
| 1,454,682 | 5/1923 | Layne | 384/301 X |
| 2,125,435 | 8/1938 | Erling | 251/902 X |
| 2,571,324 | 10/1951 | Young | 51/290 X |
| 3,186,701 | 6/1965 | Skinner | 267/167 |
| 3,727,902 | 4/1973 | Burckhardt et al. | 267/180 |
| 3,884,447 | 5/1975 | Alexander et al. | 267/166 X |
| 4,043,567 | 8/1977 | Kaiser | 280/96.1 |
| 4,328,647 | 5/1982 | Gillette et al. | 51/290 X |

Primary Examiner—Andres Kashnikow
Assistant Examiner—Robert J. Oberleitner
Attorney, Agent, or Firm—Krass & Young

[57] ABSTRACT

A helical bearing bushing for use between a cylindrical shaft and an element containing a bore disposed around the shaft, such as a kingpin and steering knuckle assembly, includes a helically wound spring wire as the bearing bushing. The spring wire is helically wound to form a tubular member having interior and exterior surfaces which form the respective bearing surfaces. The tensile force of the helical spring holds arcuate surfaces of adjacent coils in elastic abutment, although lubricant under pressure can elastically separate the coils and pass from one surface to the other. Non abutting portions of the arcuate surfaces form helical lubrication grooves. Either the interior surface or the exterior surface, or both, may be machined flat to provide a better bearing surface.

16 Claims, 15 Drawing Figures

HELICALLY WOUND BUSHING

CROSS-REFERENCE TO RELATED APPLICATION

The present application is a continuation of application Ser. No. 664,362, filed Oct. 23, 1984, and now abandoned.

BACKGROUND OF THE INVENTION

The present invention relates to bushings in general and more particularly to helically wound bushings.

In U.S. Pat. Nos. 4,003,562 and 4,043,567, both assigned to the same assignee as the present application, there are disclosed spiral bushings, for use, for example, in heavy motor vehicle spring shackles and steering knuckle assemblies. The spiral bushings disclosed therein are made from flat strips of high grade tool steel cut at an angle at each end, bevelled and notched on the edges. The strips are helically wound into a cylindrical configuration resembling a helical tension spring in that each coil or spiral abuts the adjacent coil or spiral. The tapered ends of the strips provide square ends when the strips are wound into a cylindrical configuration. The strips are rectangular in cross-section with a ratio of width to thickness of about 7 to 1.

The helically wound cylinder is, after annealing, placed in a die, and sized for roundness by hydraulically driving a sizing mandrel through them. The bushings are subsequently heat treated for hardness, ground, and honed in their interior. Their peripheral surface is ground, after which a contra-helical grease distribution groove is formground on the peripheral surface to prevent blockage of the grease port if improperly oriented during installation, the bevelled edges of the strip providing external and internal lubricant distribution grooves, and the edge notches lubricant passageways from the external grooves to the internal grooves.

The resulting product is a precision tool steel helically wound bushing or bearing having the unique capability of being manually installed in and removed from a bore by twisting axially thus reducing the outside diameter of the bushing sufficiently to eliminate the interference fit with the bore. Once installed in the bore, the bushing springs back to a compression fit. However, such bushings are high in material cost, processing costs, and other associated production costs.

SUMMARY OF THE INVENTION

The present invention is an improvement on the helically wound flat strip bushings disclosed in the aforesaid patents. The present invention provides helically wound bushings made in the form of helical tension springs wound from spring steel wire, and thus manufactured at a substantial saving in cost. By appropriate machining and grinding or honing of the internal surface and grinding of the external surface of the helically wound cylindrical spring wire, bushings for applications similar to the helically wound flat strip bushings are provided with any appropriate ratio of width to the thickness of the coils or spirals from 1 to 1, without machining, to 2 to 1, 3 to 1, or more, depending on the diameter of the wire, the wall thickness sought to be obtained, and the amount of grinding acceptable. For some applications, only the internal surface needs to be ground and honed, while, for other applications only the external surface of the bushings needs to be ground. Because of the closely wound spirals of the bushing and the relative narrowness of each spiral, many lubrication trapping grooves are formed on the peripheral surface, or on the internal surface of the bushings and, for most applications, it has been discovered that edge notching for providing lubricant passageways from the peripheral surface to the internal surface of the bushings may be dispensed with.

Flat strip bushings as disclosed in the aforesaid patents are wound to an external diameter larger than the internal diameter of the bore in which they are installed, and thus they require a substantial torsional force to wind them up for reducing their outside diameter for installation or removal. With bushings made of helically wound spring wire according to the present invention, the torsional force required for winding up the bushings for installation and removal is substantially reduced, unless it is desired to provide a substantial preload force to be applied by the bushings on the surface of the bore in which they are installed.

The diverse objects and advantages of the present invention will become apparent to those skilled in the art when the following description of the best modes contemplated at the present for practicing the invention is read in conjunction with the accompanying drawing wherein like reference numerals refer to like or equivalent parts, and in which:

DETAILED DESCRIPTION OF THE PREFERRED EMBODIMENTS

Figure 1:
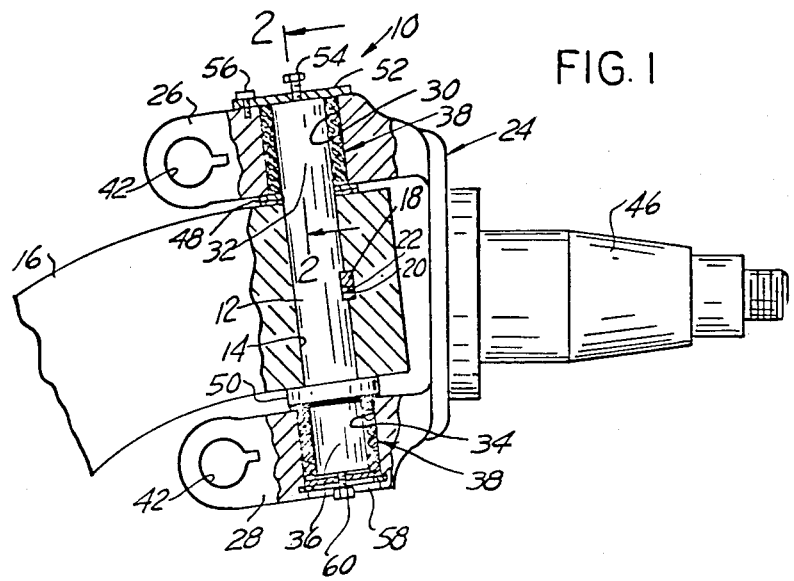
FIG. 1 is a schematic illustration of an example of application of helically wound bushings according to the present invention to a motor vehicle steering knuckle assembly.

Referring to the drawing and more particularly to FIG. 1, there is illustrated a steering knuckle assembly 10 as an example of application of the helically wound bearing of the invention. The steering knuckle assembly 10 comprises a kingpin 12 mounted in a bore 14 in opposite ends of the rigid front axle or beam 16 of a motor vehicle, not shown, such as a truck for example. The kingpin 12 is mounted substantially vertically by means of a tapered lock pin 18 pressed through a tapered channel 20 through the axle or beam 16 and a corresponding straight notch 22 formed on the periphery of the kingpin 12. In this manner, the kingpin 12 is held in the bore 14 against rotation and against vertical displacement along its longitudinal axis. A wheel spindle knuckle 24 is pivotally mounted relative to the kingpin 12 by way of two integral upper and lower yoke portions 26 and 28, the upper yoke portion having a bore 30 accepting the upper end portion 32 of the kingpin 12, while the lower yoke portion 28 is similarly provided with a bore 34 surrounding the kingpin lower end portion 36. A helically wound bushing 38 is disposed in the upper yoke bore 30 for pivotably supporting the upper yoke portion 26 around the kingpin upper end portion 32, and a similar helically wound bushing 38 is disposed in the lower yoke bore 34 between the bore surface and the lower end portion 36 of the kingpin 12. The two wheel spindle knuckles 24, one on each end of the axle or beam 16, are coupled for simultaneous pivoting by an appropriate tie rod, not shown, generally provided with a ball and socket joint at its ends, tha ball, for example, having a stud fastened through an appropriate opening 42 at one of the yoke members, while another tie rod displaced by the steering mechanism of the vehicle is attached at its end by way of a stud fastened through another opening 42 disposed in the other yoke member.

The upper and lower yoke members 26 and 28 are integral parts of a single-piece forging, for example, and they form a generally U-shaped member supporting the spindle 46 of a steerable road wheel, not shown. A plurality of annular spacer shims 48 are mounted around the kingpin 12 where it projects on the top of the axle or beam 16 to provide appropriate clearance between the upper yoke portion 26 and the axle or beam 16, while an annular thrust bearing 50 is disposed around the kingpin 12 where it projects below the axle or beam 16, the thrust bearing 50 transmitting the load from the axle or beam 16 to the lower yoke portion 28.

Figure 2:
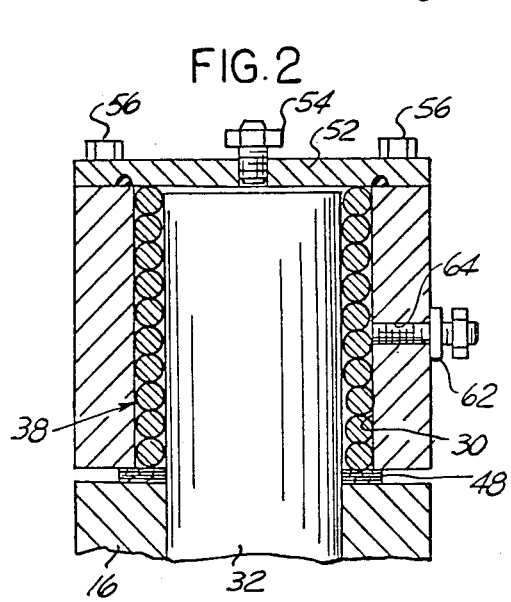
FIG. 2 is a partial section of the assembly of FIG. 1 as seen from line 2—2 of FIG. 1.

The upper end of the upper yoke bore 30 is closed by a cap 52, FIGS. 1 and 2, provided substantially at its center with a one-way check valve 54 and fastened on the top of the upper yoke 26 by means of bolts, such as bolts 56. Similarly, the end of the lower yoke member bore 34 is closed by an end cap 58 also provided with a one-way check valve 60. The check valves 54 and 60 permit visual observation of the escape of lubricant introduced through grease fittings, such as the grease fitting 62, FIG. 2, having a passageway 64 leading into the yoke bore, such as the upper yoke bore 30, to properly lubricate the peripheral surface of the kingpin portions 32 and 36 and the helically wound bushings 38. When lubricant is observed to flow through the check valves 54 and 60, it is an indication that the kingpin-yoke assembly has been fully lubricated.

Figure 3:
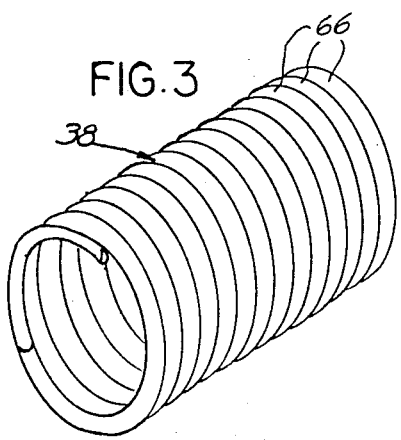
FIG. 3 is a perspective view of an example of a helically wound bushing according to the present invention.
Figure 4:
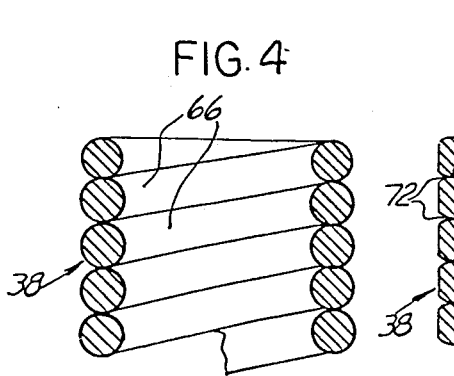
FIG. 4 is a schematic sectional view through the helically wound bushing of FIG. 3.

The helically wound bushing 38, FIGS. 2–4, is cut off from a length of helically wound spring wire of any appropriate diameter, in the form of a tension spring having adjacent spirals 66, FIGS. 3 and 4. As shown in FIGS. 4–9, the circular cross-section of the spring wire forms arcuate surfaces which abut one another as consecutive spirals 66 are wound together with predetermined tensile strength. The prewound, or precoiled spring wire is obtained as a stock material in any convenient length, and wound to an appropriate outside diameter and tensile strength. In order to make a helically wound bushing 38, the stock material is cut at right angle to its longitudinal axis by, for example, an abrasive disk and each length forming an individual helically wound bushing 38 is subsequently resized and straightened in an appropriate die. For some applications, although very rarely, the helically wound bushing 38 may be used without further machining, as shown, for the sake of illustration only, at FIGS. 2–4. However, for some applications, the helically wound bushing 38 is ground and/or honed on its peripheral surface, or ground and/or honed on its internal surface according to which one of the surfaces is desired to be used as a bearing surface. For most applications, the helical bushing 38 is ground and/or honed on both its internal and external diameters such that every coil or spiral 66 is no longer circular in section but is provided with a flat 68 on its exterior surface, FIGS. 5–7, and with a flat 70 on its inner surface. The result is that the periphery of the bushing 38 consists of consecutive adjacent cylindrical surfaces, helically disposed, for engagement with the bore surface in which the bushing 38 is ultimately installed, such as the yoke bores 30 and 34, FIG. 1, for example, and the bore of the bushing consists of a succession of spirally or helically arranged cylindrical surfaces, corresponding to the flat 70, providing a bearing surface for a member such as the kingpin ends 32 and 36. The unground arcuate surfaces have portions which continue to elastically abut one another under the tensile force, while non abutting portions form a helical groove as discussed hereinafter.

Figure 5:
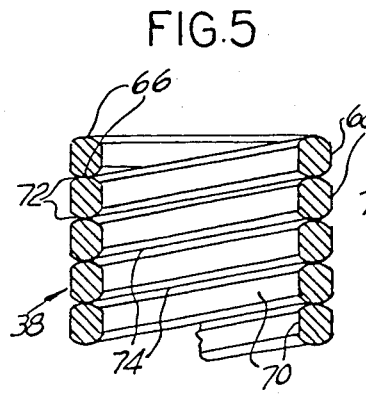
FIGS. 5–13 are views similar to FIG. 4 but showing modifications thereof.
Figure 6:
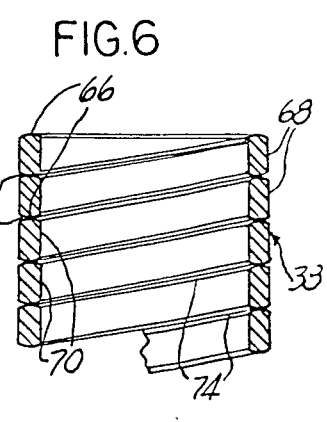
Figure 7:
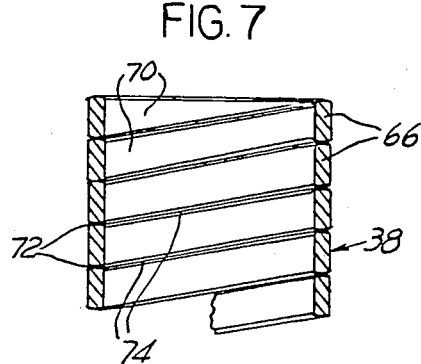

The depths of grinding of the outer diameter of the helically wound bushing 38 and of the internal diameter may be equal as illustrated in the progression of FIGS. 5 through 7, resulting in final dimensions and in the thickness of the wall of the bushing 38 being what is desirable for a particular application.

Figure 8:
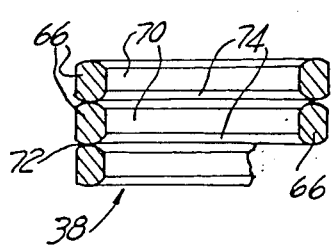
Figure 9:
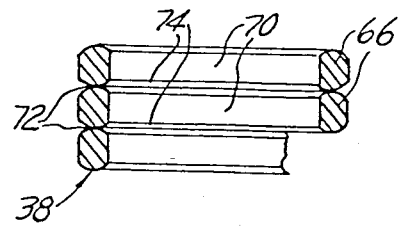

Examples of unequal rates of machining of the peripheral surface and of the internal surface are illustrated at FIGS. 8 and 9 to demonstrate the versatility of the invention for producing helically wound bushings.

A continuous helical groove, as shown at 72, is formed around the periphery of the helically wound bushing 38 by non abutting portions of the arcuate surfaces, thus doing away with the requirement of providing tapered edges in the flat strip of prior art spiral bushings for forming lubricant distributing grooves. Similarly, a continuous helical internal groove 74 is formed between non abutting portions of consecutive adjacent coils or spirals 66 of the helically wound bushing 38 for supplying lubricant to the bearing surfaces between a cylindrical member, such as the kingpin end portions 32 and 36, FIG. 1, and the bushing bore. Although the helically wound spring wire bushing 38 is wound as a tension spring causing consecutive coils or spirals 66 to engage each other at their abutting arcuate surfaces with a certain amount of elastic pressure, the elastic pressure may be controlled such as when a lubricant, such as grease, for example, is introduced under pressure through the grease fitting 62, FIG. 2, the consecutive coils or spirals 66 are caused to elastically separate, thus offering passage to the lubricant from the exterior grooves 72 of the bushing to the interior grooves 74, without requiring notching, thus providing adequate lubrication to the bushing bore surface. In addition, because the coils or spirals 66 are relatively narrow, no special precaution is required, when installing the bushing 38 in a bore, for registering the peripheral helical groove 72 with the outlet of a grease fitting, and no counter groove is necessary.

Starting with a cylindrical spring wire which is helically wound to an appropriate diameter and by grinding the interior and exterior of the bushing, any appropriate ratio of the width of the coils or spirals 66 to the wall thickness of the bushing 38 may be achieved, from a 1 to 1 ratio, as illustrated at FIG. 3, wherein no machining of the outer diameter and inner diameter of the bushing is effected to a ratio of 2 or 3 to 1, or more, as illustrated at FIG. 7.

Figure 10:
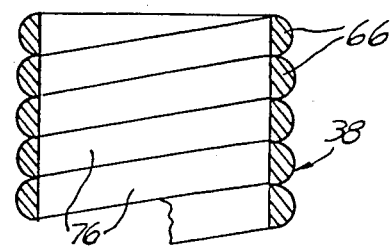
Figure 11:
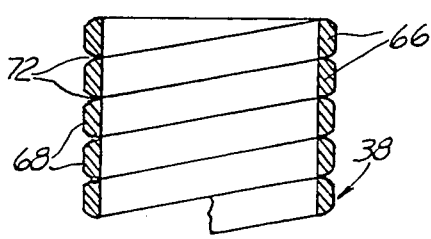

For some applications, it may be desirable to leave the outer diameter of the bushing 38 untouched and to grind and hone the inner diameter such as to form a helically wound smooth cylindrical inner surface 76, as illustrated at FIG. 10, thus having a width of coils or spirals 66 to bushing wall thickness in the ratio of 2 to 1. If a better bearing surface on the periphery of the bushing 38 is required, the periphery may be ground to an appropriate outer diameter resulting in flats 68 being spirally helically formed on the periphery of the bushing 38, FIG. 11.

Figure 12:
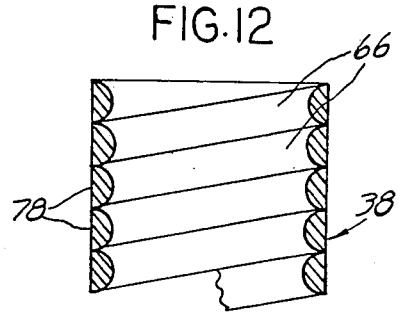
Figure 13:
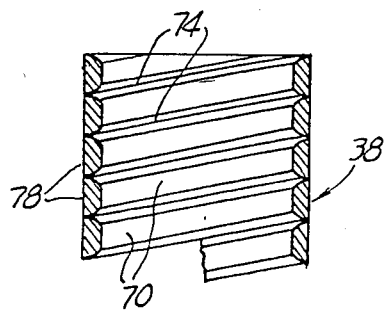

FIG. 12 illustrates a structural example wherein the internal surface of the helically wound bushing 38 has been left intact and the peripheral surface has been ground and/or honed to a cylindrical surface4 78, thus defining a bearing surface for sliding or pivotal engagement with a bore. FIG. 13 illustrates a similar structure wherein, however, flats, such as flats 70 have been ground and/or honed on the internal surface on the spirally or helically wound bushing 38 of FIG. 10, such as to form a helically wound cylindrical bearing surfaces on the interior of the bushing.

Figure 14:
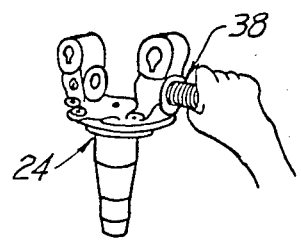
FIGS. 14–15 are views illustrating the installation in a receiving bore of a helically wound bushing according to the invention.
Figure 15:
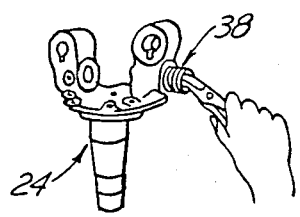

In applications wherein the helical bushings 38 are mounted in a bore, such as the bores 30 and 34 of the yokes 26 and 28 of a wheel steering knuckle 24, as illustrated at FIG. 1, the outer diameter of the bushing 38 is slightly larger than the diameter of the receiving bores. The helical bushings 38 are nonetheless easy to install manually, as illustrated at FIGS. 14 and 15 by introducing one end of the bushing into the bore end and pushing the bushing into the bore while winding the other end of the bushing in the appropriate direction reducing the diameter of the bushing. An ordinary tool, such as pliers for example, may be finally used for finishing installing the bushing in the bore, still applying an appropriate rotation to the bushing to wind it up to a smaller diameter while pushing the bushing into the bore.

Although the helically wound bushings 38 of the invention have been illustrated as being made from a length of helically wound spring wire having a circular cross-section, it will be appreciated by those skilled in the art that spring wire of any cross-sectional shape may be used, such as spring wire of square, hexagonal or rectangular cross-sectional shape may be used for accomplishing the purpose of the invention, without departing from the spirit thereof.

Having thus disclosed the present invention by examples of structure of helical bushings for diverse applications, what is claimed as new is as follows.

What is claimed is:

1. In an assembly comprising an element having a bore of predetermined diameter and a cylindrical member of predetermined diameter disposed in said bore, an improved helical bearing bushing interposed between said bore and said cylindrical member, said bushing comprising:

a tubular member having an internal surface for engagement with said cylindrical member and an external surface for engagement with said bore, said tubular member comprising a length of spring wire having a circular cross section helically wound into consecutive coils having a predetermined tensile force, wherein each coil has at least one arcuate surface for abutting an arcuate surface of an adjacent coil and the tensile force elastically holds a portion of said arcuate surfaces in mutual abutment such that lubricant under pressure can overcome said tensile force and pass from one to the other of said internal and external surfaces by elastically separating said butting arcuate surfaces, and wherein non abutting portions of said arcuate surfaces define a spiral lubricant groove formed in at least one of said internal and said external surfaces and at least one of said internal and external surfaces is machined.

2. The helical bearing of claim 1 wherein said bearing surface is on the internal surface of said tubular member.

3. The helical bearing of claim 1 wherein said bearing surface is on the external surface of said tubular member.

4. The helical bearing of claim 1 wherein said bearing surface is on both the external and internal surfaces of said tubular member.

5. A method for making a helical bearing bushing for use between a cylindrical member and an element having a bore disposed around said cylindrical member, said method comprising:

forming a tubular member by helically winding a length of spring wire having a circular cross section into consecutive coils having a predetermined tensile force, wherein each coil has at least one arcuate surface for abutting an arcuate surface of an adjacent coil and the tensile force elastically holds a portion of said arcuate surfaces in mutual abutment such that lubricant under pressure can overcome said tensile force and pass from one to the other of said internal and external surfaces by elastically separating said abutting arcuate surfaces, and wherein non abutting portions of said arcuate surfaces define a spiral lubricant groove formed in at least one of said internal and said external surfaces, and machining at least one of said internal and external surfaces.

6. The method of claim 5 wherein said machining is effected on the internal surface of said tubular member.

7. The method of claim 6 wherein said machining is grinding.

8. The method of claim 6 wherein said machining is honing.

9. The method of claim 5 wherein said machining is effected on the external surface of said tubular member.

10. The method of claim 9 wherein said machining is grinding.

11. The method of claim 9 wherein said machining is honing.

12. The method of claim 1 wherein said machining is effected on both the external and internal surfaces of said tubular member.

13. The method of claim 12 wherein said machining is grinding.

14. The method of claim 12 wherein said machining is honing.

15. The method of claim 5 wherein said machining is grinding.

16. The method of claim 5 wherein said machining is honing.